United States Patent
Chang et al.

(10) Patent No.: US 6,519,118 B2
(45) Date of Patent: Feb. 11, 2003

(54) READ HEAD WITH READ TRACK WIDTH DEFINING LAYER THAT PLANARIZES THE WRITE GAP LAYER OF A WRITE HEAD

(75) Inventors: Henry C. Chang, San Jose, CA (US); Cherngye Hwang, San Jose, CA (US); Robert Otto Schwenker, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/094,913

(22) Filed: Mar. 11, 2002

(65) Prior Publication Data

US 2002/0089794 A1 Jul. 11, 2002

Related U.S. Application Data

(62) Division of application No. 09/212,724, filed on Dec. 16, 1998, now Pat. No. 6,434,814.

(51) Int. Cl.$^7$ .............................. G11B 5/127; G11B 5/33
(52) U.S. Cl. ....................................................... 360/317
(58) Field of Search ................................ 360/317, 325, 360/327.3, 327.31, 119, 120, 121, 322, 313, 110

(56) References Cited

U.S. PATENT DOCUMENTS

| | | | | |
|---|---|---|---|---|
| 4,782,414 A | * | 11/1988 | Krounbi et al. | 360/320 |
| 5,079,035 A | * | 1/1992 | Krounbi et al. | 29/603.14 |
| 5,079,663 A | * | 1/1992 | Ju et al. | 360/322 |
| RE34,099 E | * | 10/1992 | Krounbi et al. | 360/322 |
| 5,175,658 A | * | 12/1992 | Chang et al. | 360/234.5 |
| 5,185,293 A | * | 2/1993 | Franke et al. | 148/DIG. 105 |
| 5,256,249 A | * | 10/1993 | Hsie et al. | 216/38 |
| 5,271,802 A | * | 12/1993 | Chang et al. | 216/22 |
| 5,276,579 A | * | 1/1994 | Takamori | 360/119 |
| 5,568,335 A | * | 10/1996 | Fontana et al. | 360/320 |
| 5,641,557 A | * | 6/1997 | Ishiwata | 324/252 |
| 5,646,805 A | * | 7/1997 | Shen et al. | 324/252 |
| 5,717,228 A | * | 2/1998 | Matsuoka et al. | 257/197 |
| 5,751,526 A | * | 5/1998 | Schemmel | 360/126 |
| 5,876,843 A | * | 3/1999 | Ishiwata | 324/252 |
| 6,385,017 B1 | * | 5/2002 | Min et al. | 360/324.12 |

FOREIGN PATENT DOCUMENTS

| | | | | |
|---|---|---|---|---|
| EP | 0690439 A1 | * | 1/1996 | |
| JP | 7-121839 A | * | 11/1984 | |
| JP | 59-195889 | * | 11/1984 | 216/22 |
| JP | 59-195889 A | * | 5/1995 | |

* cited by examiner

Primary Examiner—David Davis
Assistant Examiner—Julie Anne Watko
(74) Attorney, Agent, or Firm—Ervin F. Johnston

(57) ABSTRACT

A read track width defining layer is employed for defining first and second side edges of a read sensor. The read track width defining layer preferably remains in the head to planarize the read head at first and second hard bias and lead layers so as to overcome a problem of write gap curvature in an accompanying write head. The read track width defining layer is defined by a subtractive process about a bilayer photoresist layer. The subtractive process is selective to the read track width defining layer over a read sensor material layer therebelow. Ion milling is then employed for defining first and second side edges of a read sensor layer employing the read track width defining layer as a mask. First and second hard bias and lead layers are then deposited which make contiguous junctions with the first and second side edges of each of the read sensor and read track width defining layers. The photoresist is then removed and the remainder of the read head is completed.

20 Claims, 10 Drawing Sheets

READ HEAD WITH READ TRACK WIDTH DEFINING LAYER THAT PLANARIZES THE WRITE GAP LAYER OF A WRITE HEAD

CROSS-REFERENCE TO RELATED APPLICATION

This is a divisional application of application Ser. No. 09/212,724 filed Dec. 16, 1998, now U. S. Pat. No. 6,434,814.

BACKGROUND OF THE INVENTION

1. Field of the Invention

The present invention relates to a read head that has a read track width defining layer that planarizes the write gap layer of a write head and, more particularly, to a read head and method of making wherein a read track width defining layer is located between the read sensor of the read head and the write gap layer of the write head and has a thickness which substantially planarizes the read head at the level of first and second hard bias and lead layers which, by replication of subsequent layers, planarizes the write gap layer.

2. Description of the Related Art

The heart of a computer is an assembly that is referred to as a magnetic disk drive. The disk drive includes a rotating magnetic disk, write and read heads that are suspended by a suspension arm above the rotating disk and an actuator that swings the suspension arm to place the read and write heads over selected circular tracks on the rotating disk. The read and write heads are directly mounted on a slider that has an air bearing surface (ABS). The suspension arm biases the slider into contact with the surface of the disk when the disk is not rotating but, when the disk rotates, air is swirled by the rotating disk adjacent the ABS to cause the slider to ride on an air bearing a slight distance from the surface of the rotating disk. The write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A write gap layer between the first and second pole piece layers forms a magnetic gap at an air bearing surface (ABS) of the write head. The pole piece layers are connected at a back gap. Current conducted to the coil layer induces a magnetic field across the magnetic gap between the pole pieces. This field fringes across the magnetic gap for the purpose of writing information in tracks on moving media, such as the circular tracks on the aforementioned rotating disk, or a linearly moving magnetic tape in a tape drive.

The read head includes first and second shield layers, first and second gap layers, a read sensor and first and second lead layers that are connected to the read sensor for conducting a sense current through the read sensor. The first and second gap layers are located between the first and second shield layers and the read sensor and the first and second lead layers are located between the first and second gap layers. The distance between the first and second shield layers determines the linear read density of the read head. The read sensor has first and second side edges that define a track width of the read head. The product of the linear density and the track density equals the real density of the read head which is the bit reading capability of the read head per square inch of the magnetic media.

Rows and columns of combined read and write heads are made on a wafer substrate located in various chambers where layers are deposited and then defined by subtractive processes. A plurality of substrate wafers may be located on a turntable which rotates within the chamber and which may function as an anode. One or more targets, which comprise materials that are to be deposited on the wafer substrates, may also be located in the chamber. The target functions as a cathode and a DC or RF bias may be applied to the cathode and/or the anode. The chamber contains a gas, typically argon (Ar), which is under a predetermined pressure. Material is then sputtered from a target onto the wafer substrates forming a layer of the desired material. Layers may also be deposited by ion beam deposition wherein an ion beam gun directs ionized atoms (ions) onto a target which causes the target to sputter material on the wafer substrate. A subtractive process may employ a gas in the chamber, such as argon (Ar), under pressure which causes sputtering of the material from portions of the wafer substrate not covered by a mask. Alternatively, the subtractive process may employ an ion beam gun that discharges high velocity ions, such as argon (Ar) ions, which impact and remove portions of the wafer substrate that are not covered by a mask.

First and second hard bias and lead layers are typically joined at first and second side edges of the read sensor in what is known in the art as a contiguous junction. A first step in making this junction is forming a read sensor material layer over the entire wafer. Then, for each magnetic head a bilayer photoresist is formed over the desired read sensor site with a top layer portion that has first and second side edges for defining the first and second side edges of the read sensor and a bottom layer portion directly on the read sensor material layer that is recessed from the top layer portion so as to provide undercuts for the purpose of lifting off subsequently deposited unwanted layer portions. The wafer is then rotated by the turntable and a subtractive process, such as ion milling, is employed for removing all of the read sensor material layer except the read sensor under the bilayer photoresist. Unfortunately, the read sensors on the outside of the wafer are subjected to a different ion milling angle than wafers on the inside of the wafer, resulting in magnetic heads which have different characteristics. A first side edge of the read sensors on the outside of the wafer is notched while a second side edge is not notched. This is due to the fact that the turntable is rotated about an axis that is at an angle to the milling direction for the purpose of minimizing redeposition of the milled material. While the bilayer photoresist is still in place a hard bias and lead layer material is deposited on the entire wafer substrate. The bilayer photoresist is then removed lifting off the bias and lead layer material deposited thereon. The result is that a first hard bias and lead layer makes good abutting engagement with the first side edge of the read sensor, however, the second hard bias and lead layer may make only partial abutting engagement with the notched second side edge of the read sensor. This occurs because the angle of deposition of the hard bias and lead layer material is different than the angle of ion milling of the second side of the read sensor. The result is that the hard bias material adjacent the notched side edge may not make sufficient abutting contact for magnetically stabilizing the magnetic domains of the read sensor. This would degrade the performance of the read head.

Another problem is that the undercut of the bilayer photoresist permits ion milling to mill, to some extent, under the undercut. This results in an unpredictable track width of the read sensor.

A further problem noted with the above process is that upon deposition of the hard bias and lead layer material there is some overlap of the hard bias and/or lead layer material on a top surface portion of the read sensor adjacent each of the first and second side edges. This can cause an exchange coupling between the hard bias material and the read sensor which adversely affects the magnetics of the read sensor and may alter the expected track width of the read sensor.

Still another problem with the above process is that the first and second hard bias and lead layers have a higher profile than the read sensor. When the second gap, the second shield/first pole piece layer and the write gap layer of the write head are deposited there is a dip in the gap layer. This dip is known in the art as write gap curvature and can significantly degrade the performance of the write head. With a curved write gap the write head writes curved magnetic impressions into a rotating disk which are then read by a linearly extending read sensor. The read sensor will only read the center portion of the curved impression which reduces read signal performance.

SUMMARY OF THE INVENTION

The present invention provides a read and write head combination wherein the read head is planarized so as to overcome write gap curvature. A method of making is also provided where a read track width defining layer is employed for defining the track width of the read sensor with improved side edges. In a preferred embodiment the read track width defining layer remains in the head for planarizing the read head and overcoming the write gap curvature problem.

In the method a read track width defining material layer is formed on a read sensor material layer. The bilayer photoresist mask is then formed for masking the aforementioned read track width defining layer. A first selective removing process is then employed for removing the read track width defining material layer, except for the read track width defining layer that is masked by the photoresist mask. The first selective removing forms the read track width defining layer with exposed first and second side edges. Then a second selective removing process is employed for removing the read sensor material layer, except for a read sensor layer portion masked by the read track width defining layer. The second selective removing process forms a read sensor layer with exposed first and second side edges. Then, hard bias and lead material layers are deposited on the photoresist mask adjacent the first and second side edges of each of the read sensor layer and the read track width defining layer. Finally, the photoresist mask is removed thereby lifting off a portion of the hard bias and lead material layer leaving first and second hard bias and lead layers connected to the first and second side edges of each of the read sensor layer and the read track width defining layer.

In a preferred embodiment the track width defining layer is carbon. When the read track width defining layer is carbon the first selective removing is preferably a reactive ion etch with an oxygen ($O_2$) base. Other materials for the read track width defining layer may be silicon (Si) or silicon dioxide ($SiO_2$). When the read track width defining layer is silicon (Si) or silicon dioxide ($SiO_2$) the first selective removing process may be a reactive ion etch with a freon ($CF_4$) base. In the preferred embodiment the read track width defining layer has a thickness which is the difference between the thickness of the hard bias and lead layer and the thickness of the read sensor. With this arrangement the read track width defining layer planarizes the read head at the hard bias and lead layer level so that subsequent layers formed on the read sensor and the first and second hard bias and lead layers do not replicate a curvature to the write gap of the write head. If desired, however, the read track width defining layer may be removed by ashing in the presence of oxygen ($O_2$) within a chamber.

An object of the present invention is to provide a combined read and write head wherein the read head is planarized so as to obviate write gap curvature of the write head.

Another object of the present invention is to provide a read head wherein contiguous junctions are made between first and second hard bias and lead layers and first and second side edges of a read sensor respectively wherein the first and second hard bias and lead layers do not overlap first and second surface portions adjacent the first and second side edges of the read sensor.

A further object of the present invention is to provide a read and write head wherein each of first and second hard bias and lead layers make a continuous abutting junction with precisely located first and second side edges of the read sensor.

Still another object is to provide a method of making a read and write magnetic head wherein a bilayer photoresist mask is employed for defining a read track width defining layer which, in turn, is employed for defining the read track width of a read sensor.

Still a further object is to provide a method of making a read and write magnetic head which substantially eliminates any portion of first and second hard bias and lead layers covering a top surface of the read sensor, implements complete abutting engagement of the first and second hard bias and lead layers with first and second side edges of the read sensor and planarizes the read head so that no curvature is replicated to the write gap layer of the write head.

Other objects and advantages of the present invention will become apparent upon reading the following description taken together with the accompanying drawings.

DESCRIPTION OF THE PREFERRED EMBODIMENTS

Figure 1:
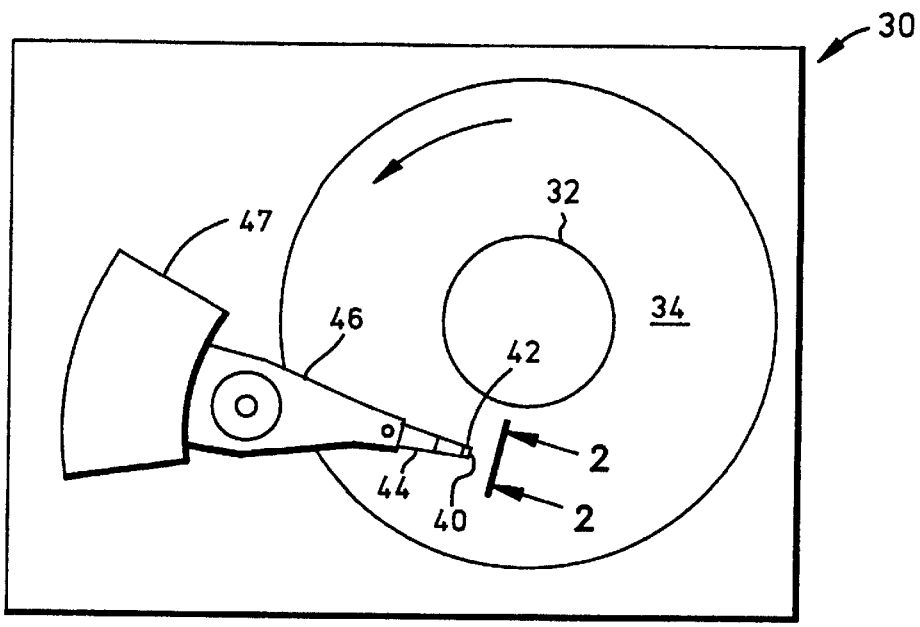
FIG. 1 is a planar view of an exemplary magnetic disk drive.
Figure 2:
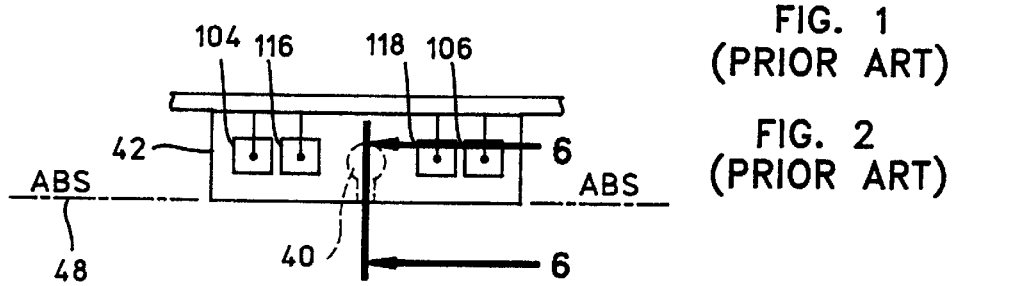
FIG. 2 is an end view of a slider with a magnetic head of the disk drive as seen in plane 2—2.
Figure 3:
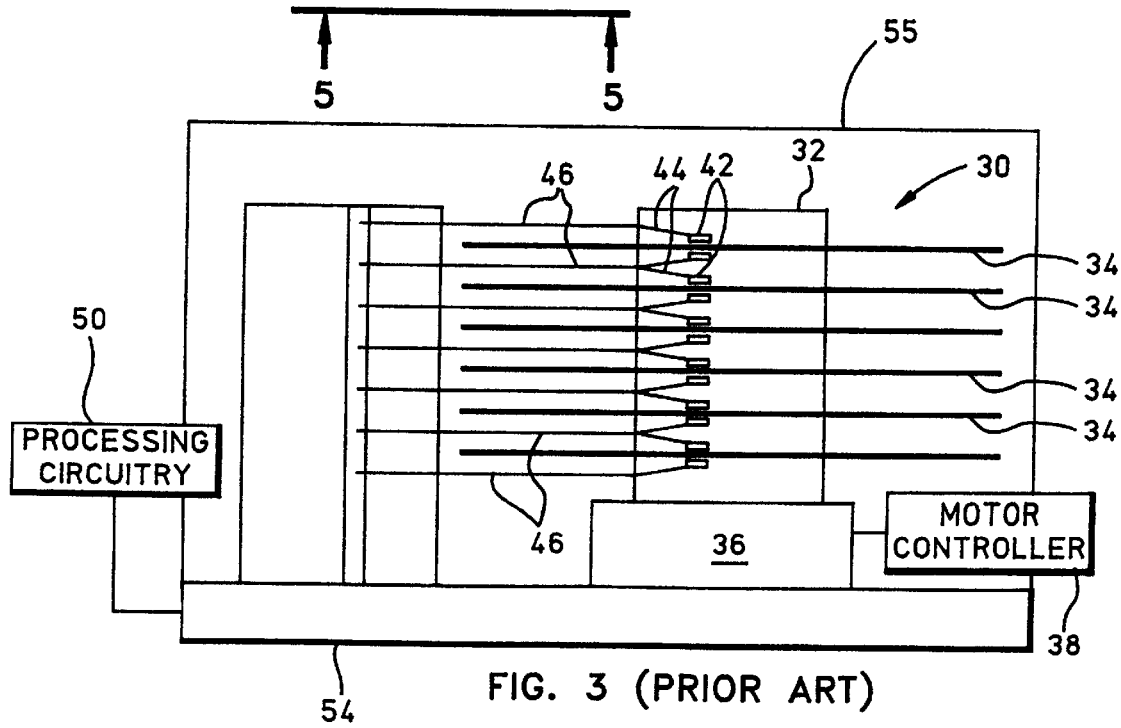
FIG. 3 is an elevation view of the magnetic disk drive wherein multiple disks and magnetic heads are employed.
Figure 4:
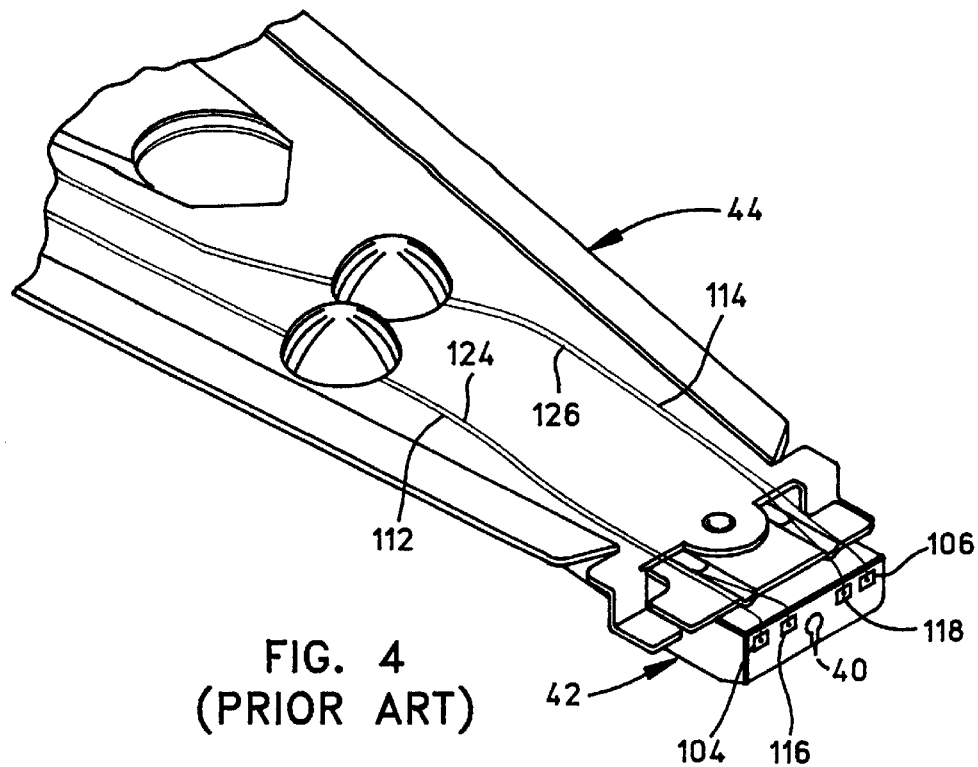
FIG. 4 is an isometric illustration of an exemplary suspension system for supporting the slider and magnetic head.

Referring now to the drawings wherein like reference numerals designate like or similar parts throughout the several views there is illustrated in FIGS. 1–3 a magnetic disk drive 30. The drive 30 includes a spindle 32 that supports and rotates a magnetic disk 34. The spindle 32 is rotated by a motor 36 that is controlled by a motor controller 38. A combined read and write magnetic head 40 is mounted on a slider 42 that is supported by a suspension 44 and actuator arm 46. A plurality of disks, sliders and suspensions may be employed in a large capacity direct access storage device (DASD) as shown in FIG. 3. The suspension 44 and actuator arm 46 position the slider 42 so that the magnetic head 40 is in a transducing relationship with a surface of the magnetic disk 34. When the disk 34 is rotated by the motor 36 the slider is supported on a thin (typically, 0.05 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides motor drive signals for rotating the magnetic disk 34, and provides control signals for moving the slider to various tracks. In FIG. 4 the slider 42 is shown mounted to the suspension 44. The components described hereinabove may be mounted on a frame 54 of a housing 55, as shown in FIG. 3.

Figure 5:
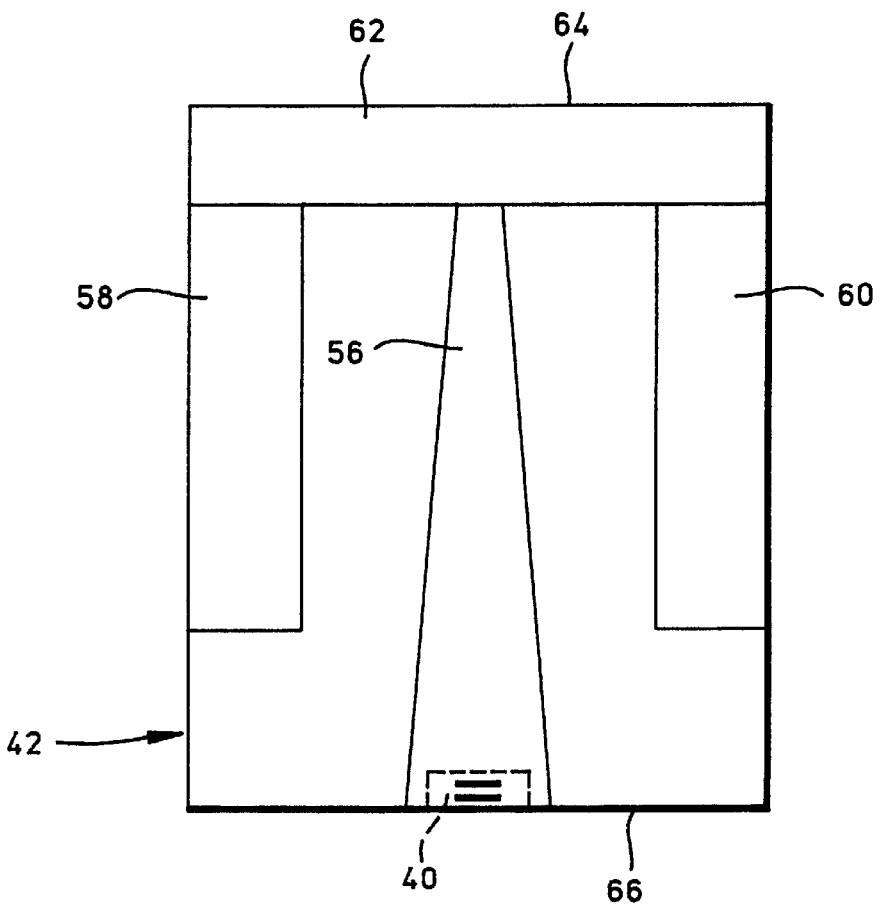
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Merged Magnetic Head

Figures 6, 7, 8:
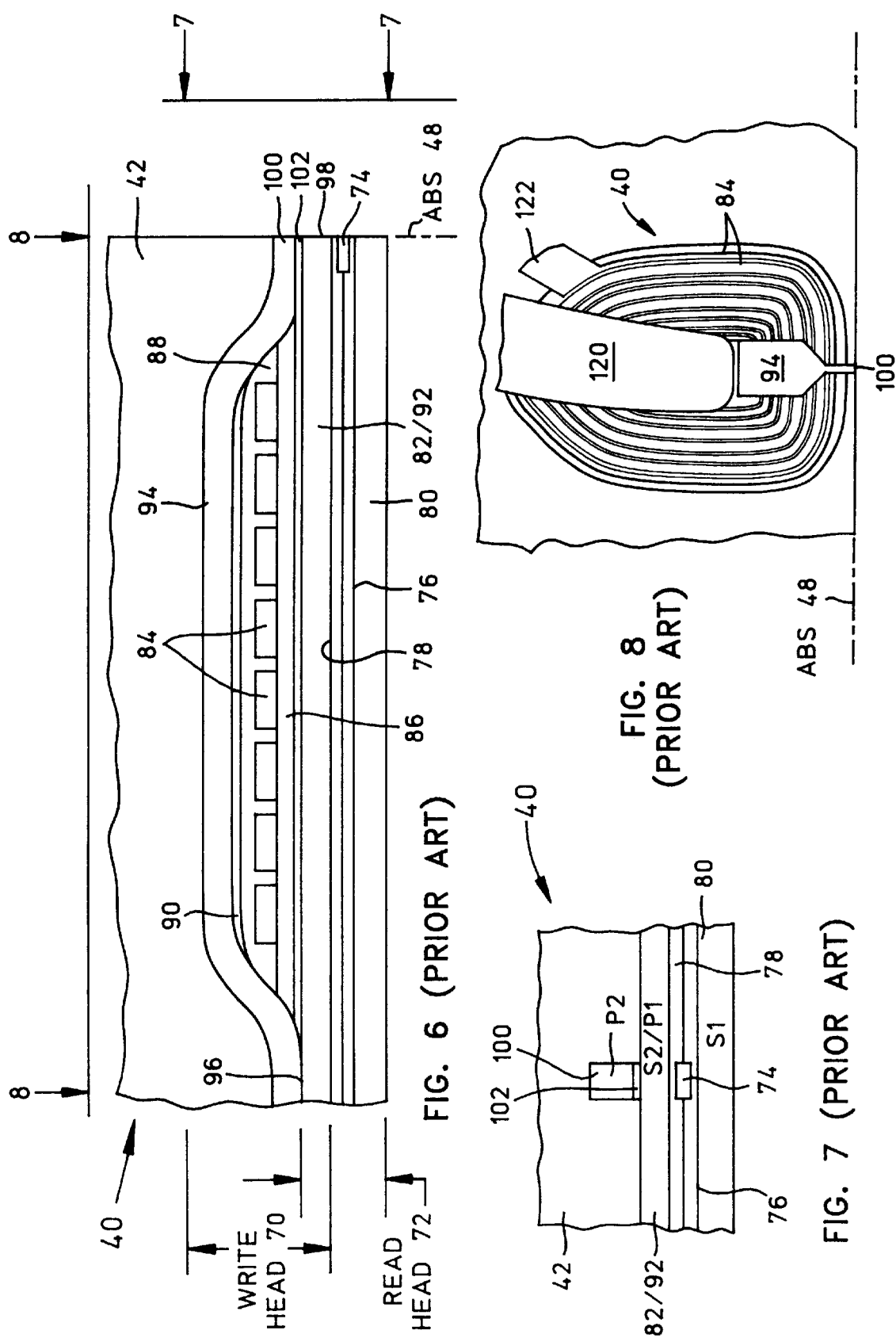
FIG. 6 is a partial view of the slider and a prior art magnetic head as seen in plane 6—6 of FIG. 2.
FIG. 7 is a partial ABS view of the slider taken along plane 7—7 of FIG. 6 to show the read and write elements of the prior art magnetic head.
FIG. 8 is a view taken along plane 8—8 of FIG. 6 with the insulation stack removed.

FIG. 6 is a side cross-sectional elevation view of the merged MR or spin valve head 40 which has a write head portion 70 and a read head portion 72, the read head portion employing an MR or spin valve sensor 74. FIG. 7 is an ABS view of FIG. 6. The sensor 74 is located between first and second gap layers 76 and 78 and the gap layers are located between first and second shield layers 80 and 82. In response to external magnetic fields, the resistance of the sensor 74 changes. A sense current $I_s$ conducted through the sensor causes these resistance changes to be manifested as potential changes. These potential changes are then processed as readback signals by the processing circuitry 50 shown in FIG. 3.

The write head portion of the merged head includes a coil layer 84 located between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are located between first and second pole piece layers 92 and 94. The first and second pole piece layers 92 and 94 are magnetically coupled at a back gap 96 and have first and second pole tips 98 and 100 which are separated by a write gap layer 102 at the ABS. As shown in FIGS. 2 and 4, first and second connections 104 and 106 connect leads from the sensor 74 (see FIG. 6) to leads 112 and 114 on the suspension 44 and third and fourth connections 116 and 118 connect leads 120 and 122 from the coil 84 (see FIG. 8) to leads 124 and 126 on the suspension. It should be noted that the merged head 40 employs a single layer 82/92 to serve a double function as a second shield layer for the read head and as a first pole piece for the write head. A piggyback head employs two separate layers for these functions.

Figure 9A:
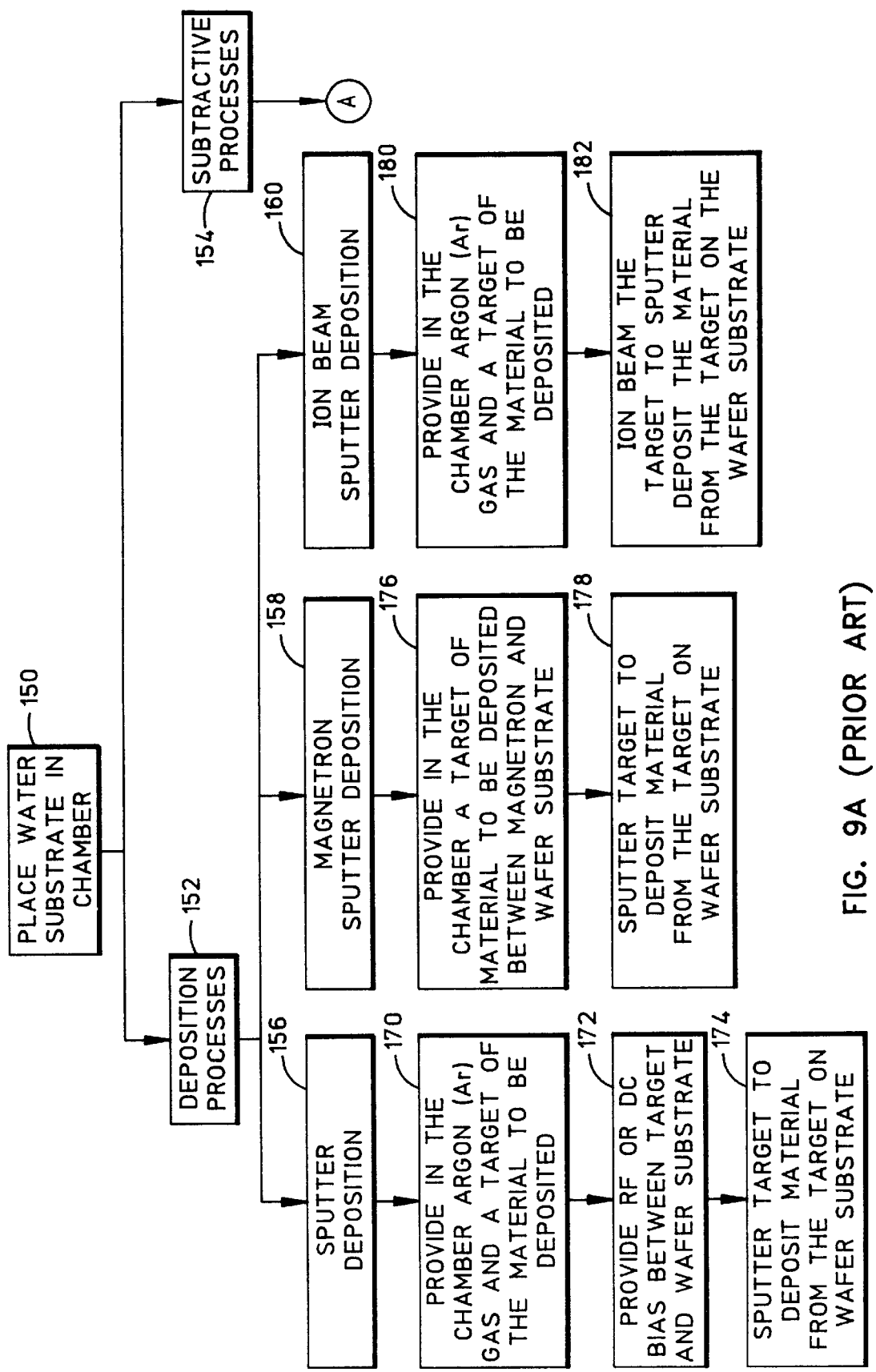
FIGS. 9A and 9B are block diagrams of various methods of depositing and milling layers within a chamber.

After placing a wafer substrate in a chamber 150, as shown in FIG. 9A, various deposition processes 152 and various subtractive processes 154 may be employed in implementing the present invention. Deposition processes may include sputter deposition 156, magnetron sputter deposition 158 or ion beam sputter deposition 160. The subtractive processes 154 may include sputter etching 162, reactive ion etching (RIE) 164, ion beam milling 166 or reactive ion beam milling 168. The sputter deposition 156 may include providing argon (Ar) gas and a target of material to be deposited in the chamber 170, providing radio frequency (rf) or direct current (dc) bias between the target and the wafer substrate 172 and sputtering the target to deposit material from the target on the wafer substrate 174. The magnetron sputter deposition 158 may include providing a target of material to be deposited in the chamber between a magnetron and the wafer substrate 176 and then sputtering the target in the field of the magnetron to deposit material from the target on the wafer substrate 178. The ion beam sputter deposition 160 may include providing an inert gas, such as argon (Ar), krypton (Kr) or xenon (Xe), and a target of the material to be deposited in the chamber 180 and then ion beaming the target to sputter deposit the material from the target on the wafer substrate 182. The sputter etching 162 may include providing argon (Ar) gas in the chamber 184, applying rf or dc bias to the wafer substrate 186 and then sputter etching the wafer substrate 188. The reactive ion etching 164 includes placing argon (Ar) and reactive gases in the chamber 189, applying a dc or rf bias to the wafer substrate 190 and then reactive ion etching the wafer substrate 192. The ion beam milling 166 includes grounding the wafer substrate 193 and then ion beam milling the wafer substrate 194. The reactive ion beam milling 168 may include placing an inert gas, such as argon (Ar) or helium (He), and reactive gases in an ion beam gun 196, grounding the wafer substrate 197 and then reactive ion beaming to mill the wafer substrate 198. The chambers are placed under various preselected pressures in order to implement the aforementioned processes. Full film deposition is made without a mask, however, when features are to be formed a mask is provided with openings where the features are to be formed. A mask is also employed for covering areas to be retained when the subtractive processes 154 are employed.

Figure 10:
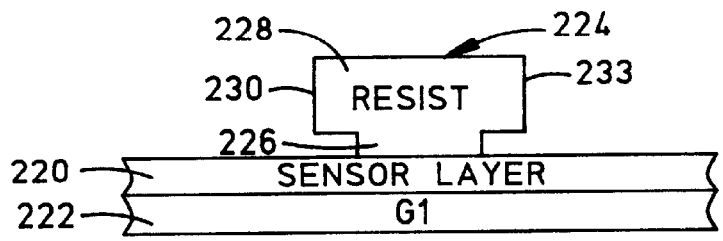
FIG. 10 is a side elevation view of a bilayer photoresist on a read sensor material layer.

FIGS. 10–13 illustrate a prior art process for making contiguous junctions between first and second hard bias and lead layers and first and second side edges of a read sensor, respectively. In FIG. 10 a read sensor material layer 220 may be formed on a nonconductive electrically insulative first gap layer (G1) 222 by depositions 156, 158 or 160 in FIG. 9A. A bilayer photoresist 224 is then formed on the read sensor material layer 220 that has first and second layer portions 226 and 228. The first layer portion 226 has a width that is less than the second layer portion 228 so as to provide the bilayer photoresist with first and second undercuts. This bilayer photoresist may be formed by forming the first and second layer portions 226 and 228, light exposing the second layer portion and developing the second layer 228 with a developer that also etches the first layer 226. The second layer portion 228 has first and second side edges 230 and 233 that define a desired track width of a subsequently formed read sensor.

Figure 11:
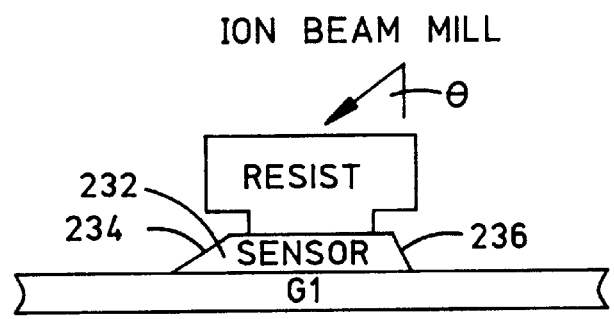
FIG. 11 is the same as FIG. 10 except ion milling has been implemented for removing the read sensor material layer except a read sensor under the bilayer photoresist.
Figure 12:
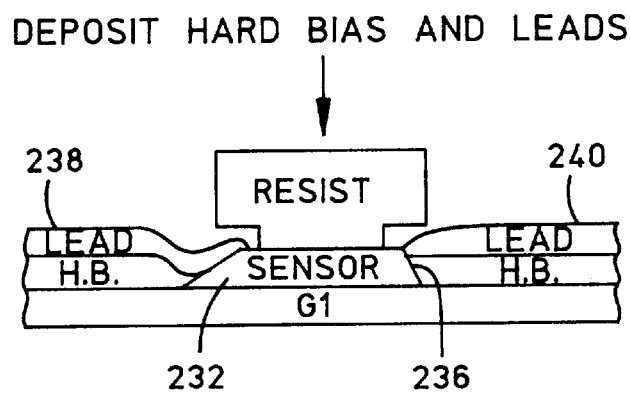
FIG. 12 is the same as FIG. 11 except first and second hard bias and lead layers have been formed.

In FIG. 11 the wafer substrate is subjected to ion beam milling (166 in FIG. 9B) as the wafer substrate is rotated, which removes all of the read sensor material layer except for the read sensor 232 between the first and second side edges 234 and 236. When a head is located near the outer perimeter of the wafer substrate the side edges 234 and 236 are significantly asymmetrical. This is because of an angle of incidence θ with respect to a normal to the read sensor surface and the divergence of the beam from a source above the center of the wafer substrate. The result is that the second side edge 234 is milled with a large taper while the first side edge 236 is fairly well defined with a small taper. The problem is not as bad for heads near the center of the wafer. In FIG. 12 first and second hard bias and lead layers 238 and 240 are formed by depositions 156, 158 or 160 in FIG. 9A wherein each hard bias and lead layer has a side edge that is formed adjacent a respective side edge of the read sensor. Unfortunately, however, the full thickness of the second hard bias and lead layer 238 does not make complete abutting contact with the second side edge 234 of the read sensor due to a notching or depression of each of the hard bias (H.B.) and lead layers 238 as shown. This is also due to the angle of incidence θ and the divergence of the beam, and is worst for heads near the outer perimeter of the wafer substrate. This reduced abutting contact can seriously degrade the magnetostatic coupling between the hard bias layer and the read sensor which can, in turn, affect the magnetic stabilization of the magnetic domains of the read sensor and render the read head inoperative.

Figure 13:
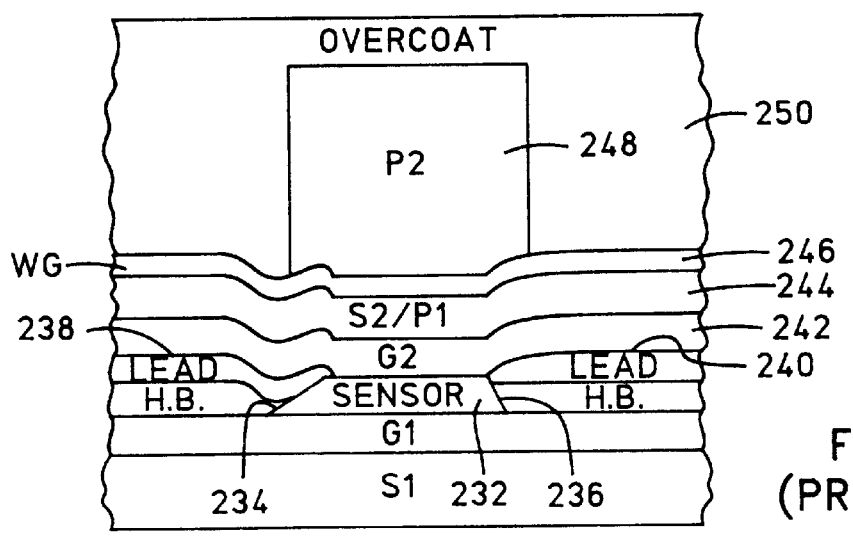
FIG. 13 is the same as FIG. 12 except a second gap layer, a second shield/first pole piece layer, a write gap layer, a second pole tip layer and an overcoat layer have been formed on the read sensor and the first and second hard bias and lead layers.

In FIG. 13 the photoresist has been removed and a second gap layer 242, a second shield/first pole piece layer 244, a write gap layer 246, a second pole tip layer 248 and an overcoat layer 250 have been formed by any of the depositions 156, 158 or 160 in FIG. 9A. Because of the higher profile of the hard bias and lead layers 238 and 240 relative to the read sensor 232 the second gap layer 242, the second shield/first pole piece layer 244 and the write gap layer 246 make a dip which results in write gap curvature of the write gap layer 246. This is not desirable since the read head reads curved magnetic impressions in a rotating magnetic disk which degrades read signal performance. It should also be noted that the first and second hard bias and lead layers overlap first and second surface portions of the read sensor adjacent the first and second side edges 234 and 236. If the hard bias layer overlaps these portions this results in an exchange coupling which can degrade the magnetic performance of the read sensor layer. The overlap can also change the track width of the read sensor. Still another problem is that the side edges 234 and 236 of the read sensor are not directly under the side edges 230 and 233 of the second layer of the bilayer photoresist. This results in a read sensor with an unreliable track width.

The Invention

Figure 14:
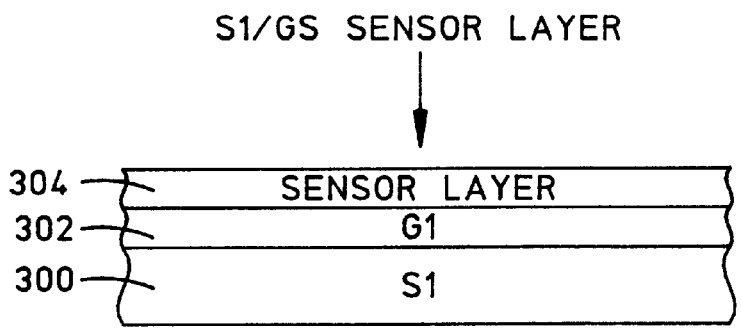
FIG. 14 is a side elevation view of a first step in the present method of making a read head.
Figure 15:
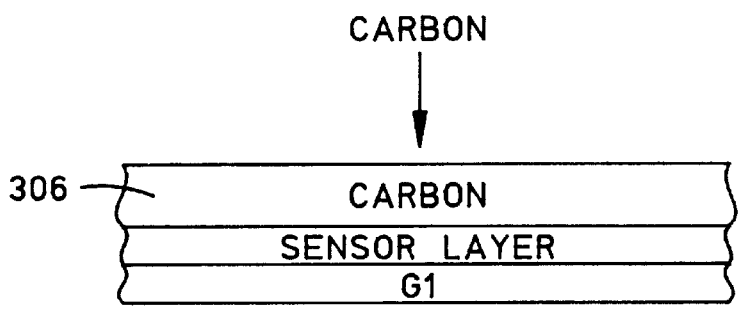
FIG. 15 is the same as FIG. 14 except a read track width defining material layer of carbon has been formed on the read sensor material layer.

FIGS. 14–21 illustrate various steps of the present method of making the read head. In FIG. 14 a ferromagnetic first shield layer (S1) 300 is formed on the wafer substrate (not shown), a nonmagnetic electrically insulative first gap layer (G1) 302 is formed on the first shield layer and a read sensor material layer 304 is formed on the first gap layer 302 by any of the depositions 156, 158 or 160 in FIG. 9A. The read sensor material layer 304 may comprise multiple layers such as an antiferromagnetic pinning layer, a ferromagnetic pinned layer, an electrically conductive spacer layer, a ferromagnetic free layer and a capping layer, which layers constitute a spin valve sensor. The ferromagnetic pinned layer may be an antiparallel (AP) pinned layer as described in U.S. Pat. 5,018,037, which is incorporated by reference herein, or a pinned layer consisting of a single thin film. The layers can differ depending upon different types of spin valve sensors or anisotropic magnetoresistive (AMR) sensors employed. In FIG. 15 a track width defining material layer 306 of carbon is formed on the read sensor material layer 304. The track width defining material layer has a predetermined thickness which will be described in more detail hereinbelow.

Figure 9B:
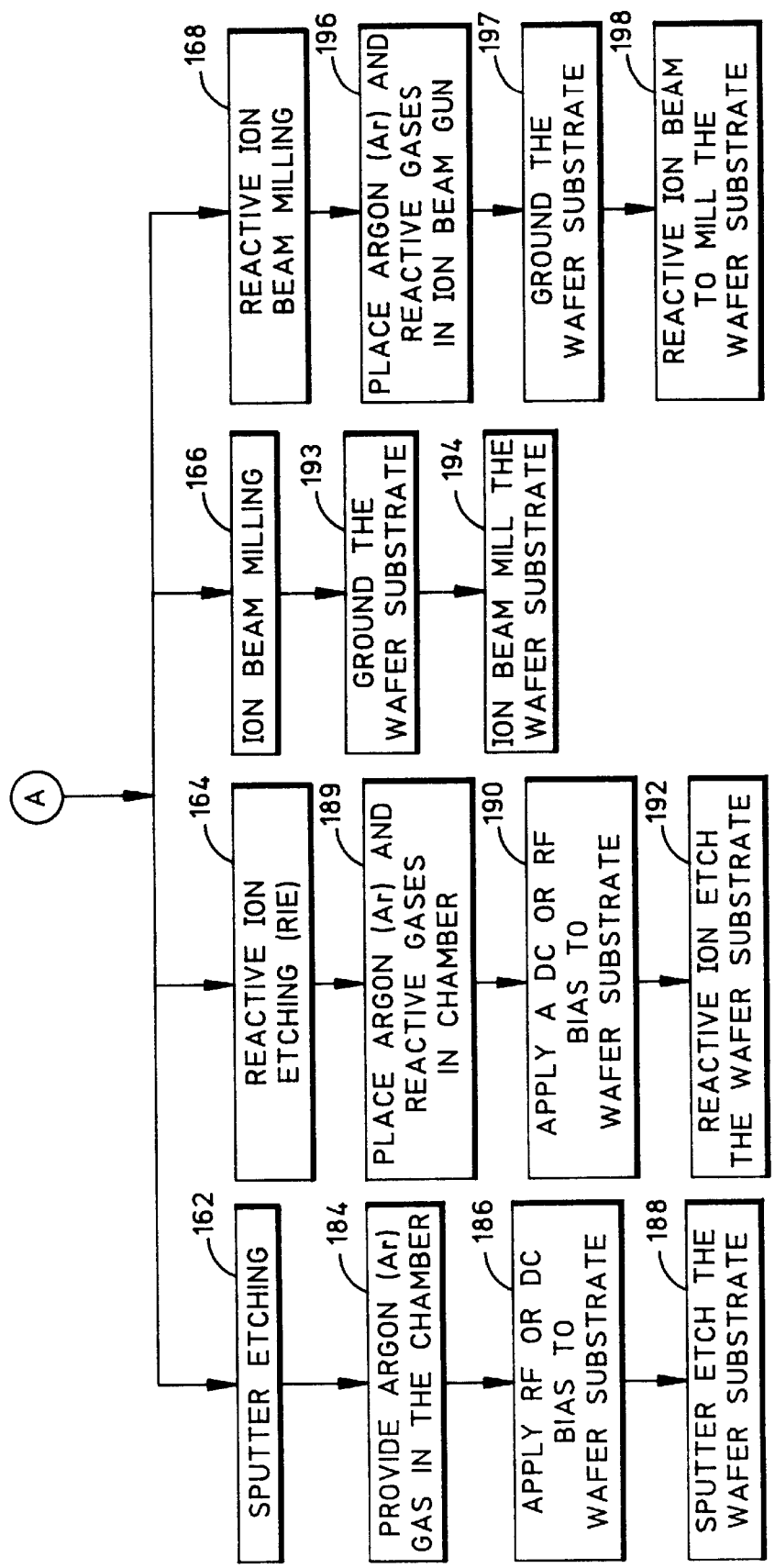
Figure 16:
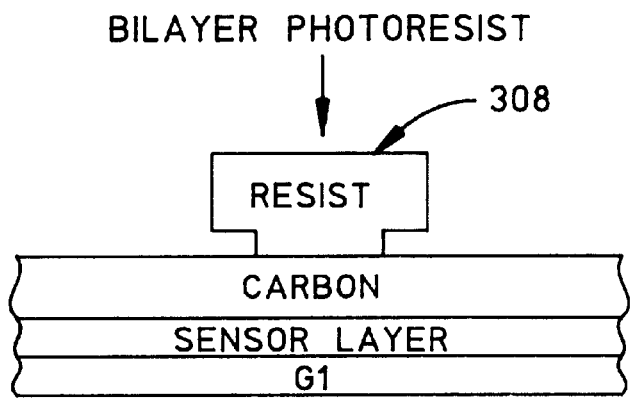
FIG. 16 is the same as FIG. 15 except a bilayer photoresist has been formed on the track width defining material layer.
Figure 17:
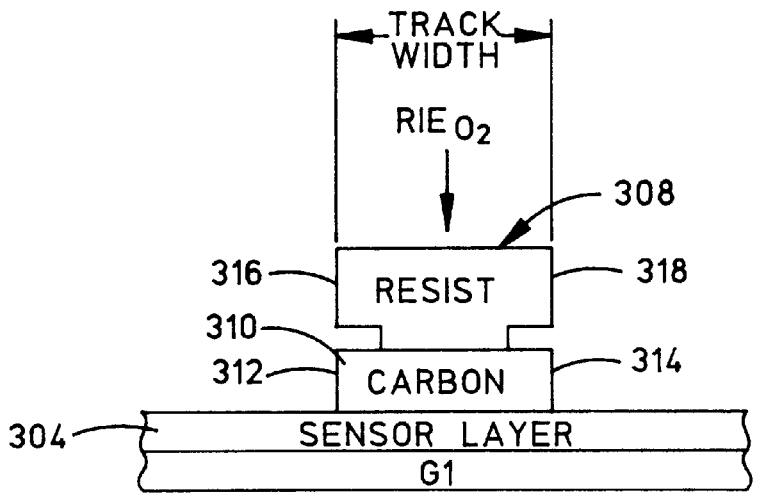
FIG. 17 is the same as FIG. 16 except reactive ion etching (RIE) has been implemented to remove all of the track width defining material layer except a track width defining material layer portion (track width defining layer) below the bilayer photoresist.

In FIG. 16 a bilayerphotoresist 308 is formed on the track width defining material layer 306 which is the same as the bilayer photoresist 224 shown in FIG. 10. In FIG. 17 a reactive ion etch (RIE) with an oxygen ($O_2$) base, as shown in 164 of FIG. 9B, is employed in a chamber (not shown) for removing all of the track width defining material layer except for a track width defining layer 310 below the bilayer photoresist 308. The chamber may contain 20% oxygen ($O_2$) and 80% argon (Ar) with a pressure of 5 millitorr. An rf bias of 150 watts may be applied to the wafer substrate. We have found that the first and second side edges 312 and 314 of the track width defining layer portion 310 are substantially aligned with first and second side edges 316 and 318 of the bilayer photoresist. This is because the RIE process is selective by a ratio of 4 to 1 to the track width defining material layer over the materials of the read sensor material layer 304 and the bilayer photoresist 308. Accordingly, the read track width defining material layer is quickly removed, except the read track width defining layer 310, without any substantial removal of the read sensor material layer 304 or the bilayer photoresist 308.

Figure 18:
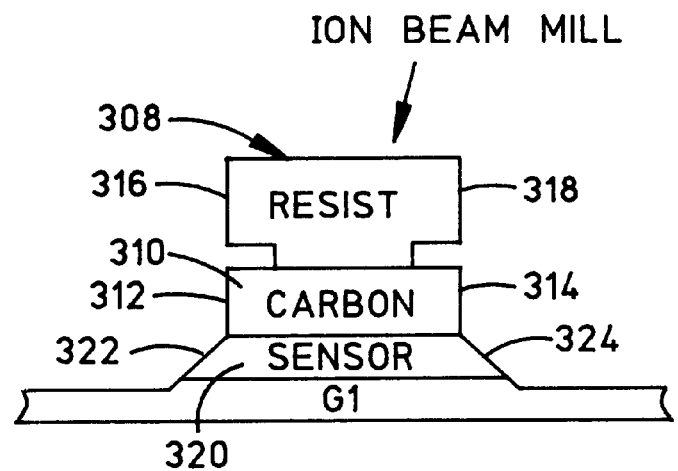
FIG. 18 is the same as FIG. 17 except ion milling has been employed for removing the read sensor material layer except for a read sensor layer directly below the track width defining layer.
Figure 19:
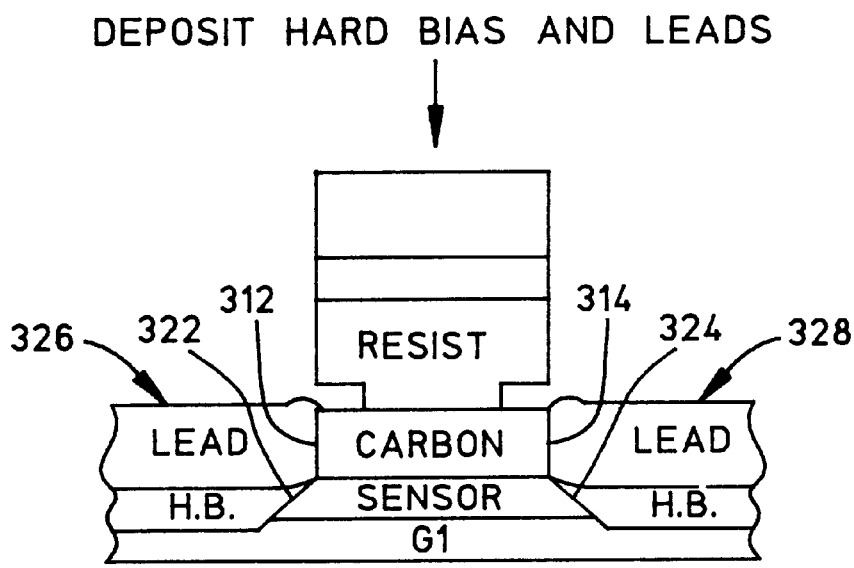
FIG. 19 is the same as FIG. 18 except first and second hard bias and lead layers have been formed.
Figure 20:
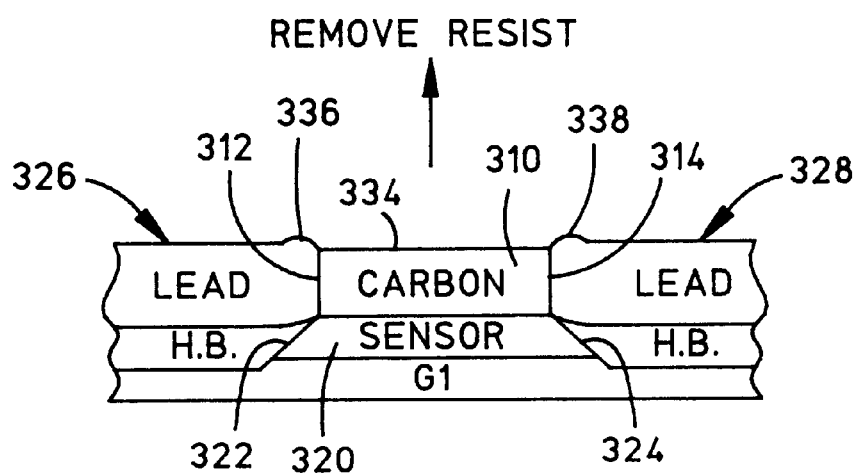
FIG. 20 is the same as FIG. 19 except the bilayer photoresist has been removed.

In FIG. 18 ion beam milling, as shown in 166 of FIG. 9B, is employed for removing all of the read sensor material layer except for a read sensor layer 320 directly below the read track width defining layer 310. This milling is selective by a ratio of 4 to 1 to the read sensor material layer 304 (FIG. 17) over the carbon of the read track width defining layer 310. It should be noted from FIG. 17 that the first and second side edges 312 and 314 of the read track width defining layer are immediately adjacent the read sensor material layer 304 so that first and second side edges 322 and 324 of the read sensor in FIG. 18 are accurately located and defined with less asymmetry between the two edges 322 and 324 for heads located nearest the outer perimeter of the wafer substrate. In FIG. 19 first and second hard bias and lead layers 326 and 328 are formed which have side edges that make complete abutting engagement with respective side edges 322 and 324 of the read sensor and the first and second side edges 312 and 314 of the read track width defining layer. In FIG. 20 the bilayer photoresist 308 is removed leaving top surfaces 330 and 332 of the first and second hard bias and lead layers 326 and 328 substantially planar with the top surface 334 of the read sensor.

Figure 21:
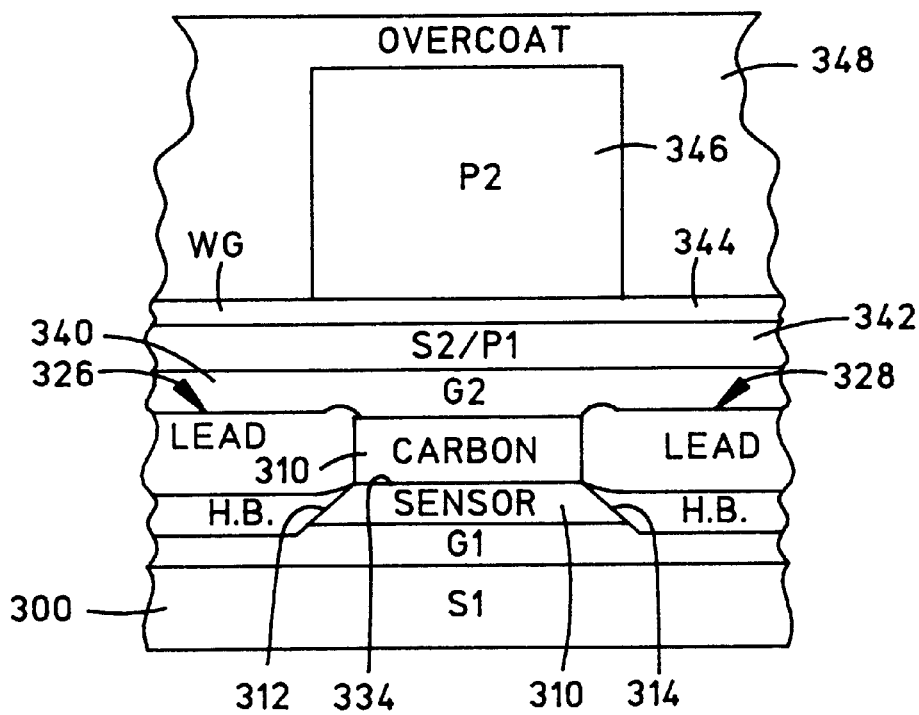
FIG. 21 is the same as FIG. 20 except the write head and additional layers of the read head are shown.

In order to accomplish this the thickness of the read track width defining layer portion 310 should be substantially the difference between the thickness of the hard bias and lead layers 326 and 328 and the thickness of the read sensor 320. This thickness is preferably 100–500 Å and, more preferably, is about 200 Å thick. The thickness of either the first and second hard bias and lead layers 326 and 328 is typically thicker than the thickness of the read sensor 320 so that when the thickness of the read sensor 320 is subtracted from the thickness of one of the hard bias and lead layers the result will be the desired thickness of the read track width defining layer 310. It should be noted that each of the first and second hard bias and lead layers have a slight rise or "bird's beak" 336 and 338. It has been found that this height is less than 100 Å, and does not affect the planarity of the read head. In FIG. 21 the complete read head is shown with a nonmagnetic electrically insulative second gap layer (G2) 340 on the read sensor 310 and the first and second hard bias and lead layers 326 and 328, a second shield/first pole piece (S2/P1) layer 342 on the second gap layer 340, a write gap layer 344 on the second shield/first pole piece layer 342, a second pole tip layer 346 on the write gap layer 344 and an overcoat layer 348 on the second pole tip layer 346 by any of the depositions 156, 158 or 160 in FIG. 9A.

It can be seen that with this method of construction there is substantially no write gap curvature of the write gap layer 344 since the read head is planarized at the first and second hard bias and lead layer level by the read track width defining layer 310. Further, it should be noted that the first and second hard bias and lead layers 326 and 328 do not overlap any portion of the top surface 334 of the read sensor adjacent its first and second side edges 312 and 314. Accordingly, the magnetic properties of the read sensor 310 are preserved as well as the desired track width.

Figure 22:
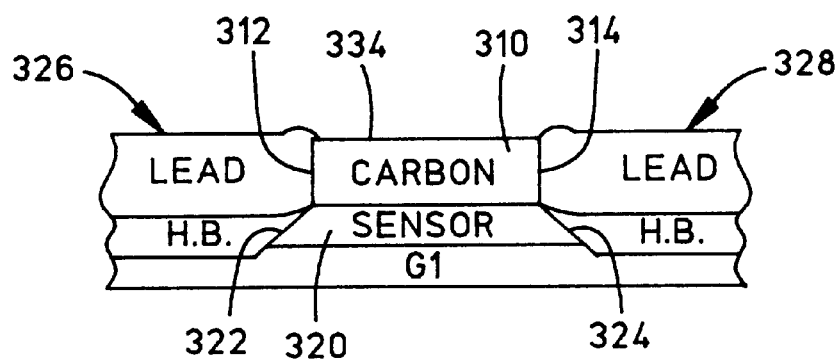
FIG. 22 is a side view of the first and second hard bias lead layers connected to the first and second side edges of the read sensor layer which is the same as that shown in FIG. 20.
Figure 23:
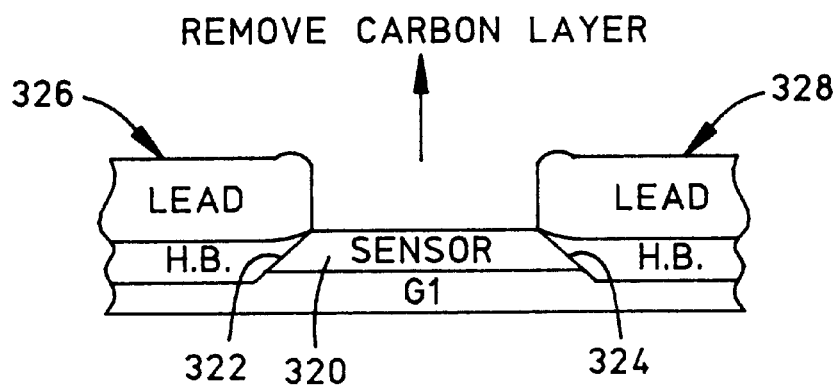
FIG. 23 is the same as FIG. 22 except the track width defining layer has been removed.
Figure 24:
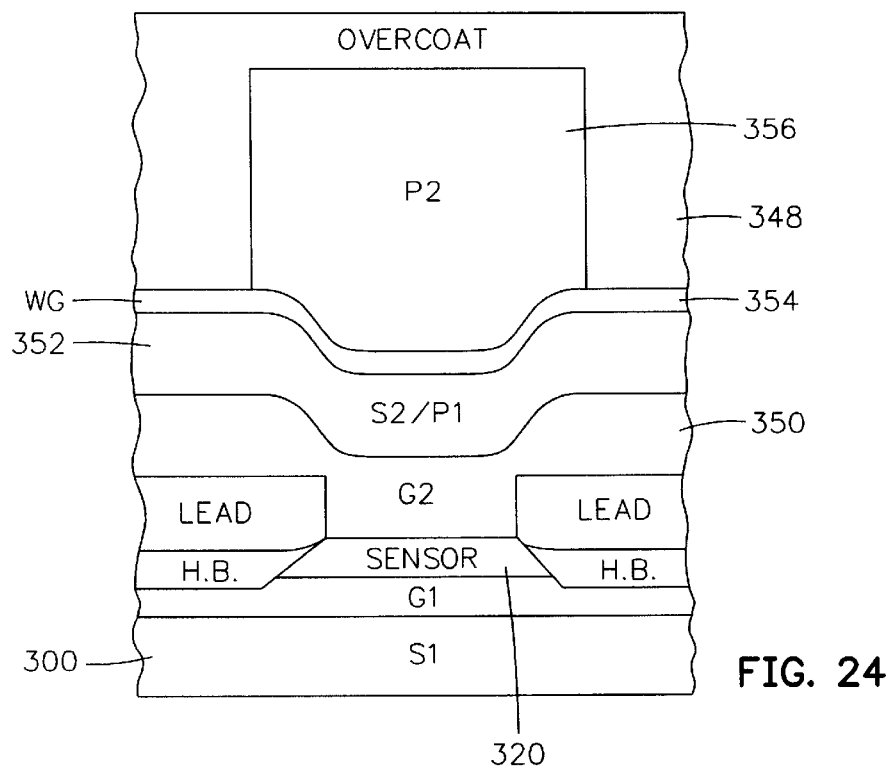
FIG. 24 is the same as FIG. 23 except the second gap layer, the second shield/first pole piece layer, the write gap layer, the second pole tip layer and an overcoat layer have been formed.

FIGS. 22–24 illustrate various steps in an alternate construction of the present read head. FIG. 22 is the same as FIG. 20. If desired, the read track width defining layer portion 310 in FIG. 22 may be removed in FIG. 23 by any suitable process such as ashing which is implemented by the presence of oxygen ($O_2$) in a chamber. This removal may be desirable if it is undesirable to have the carbon material at the ABS or if the carbon has a substantially different coefficient of expansion than other layers in the head which may stress the read sensor or protrude other layers at the ABS under high heat conditions. After forming the second gap layer (G2) 350, the second shield/first pole piece layer (S2/P1) 352 and the write gap layer 354 it can be seen that the write gap layer 354 has curvature under the second pole tip layer 356. Accordingly, the preferred embodiment is the method shown in FIGS. 14–20 and the embodiment shown in FIG. 21 since write gap curvature has been eliminated. However, the embodiment shown in FIGS. 22–24 has the advantage over the read head made by the process in FIGS. 10–13 since the read head in FIG. 24 does not have an overlap of the first and second hard bias and lead layers on top surface portions of the read sensor 320.

Figure 25:
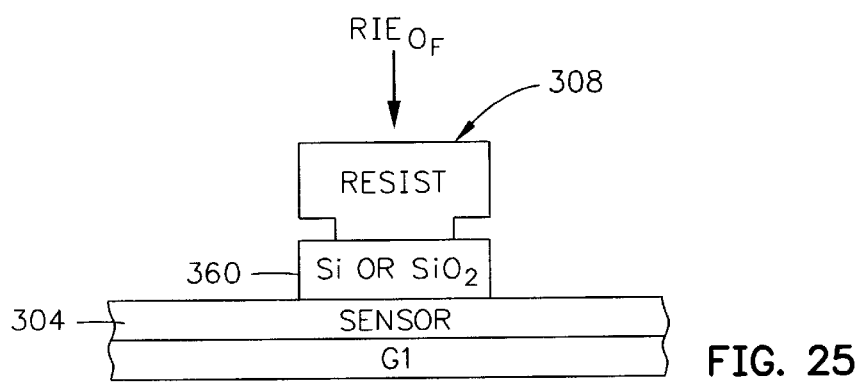
FIG. 25 is the same as FIG. 17 except silicon (Si) or silicon dioxide ($SiO_2$) is employed for the track width defining layer and RIE is employed with a fluorine base as a removal process.
Figure 26:
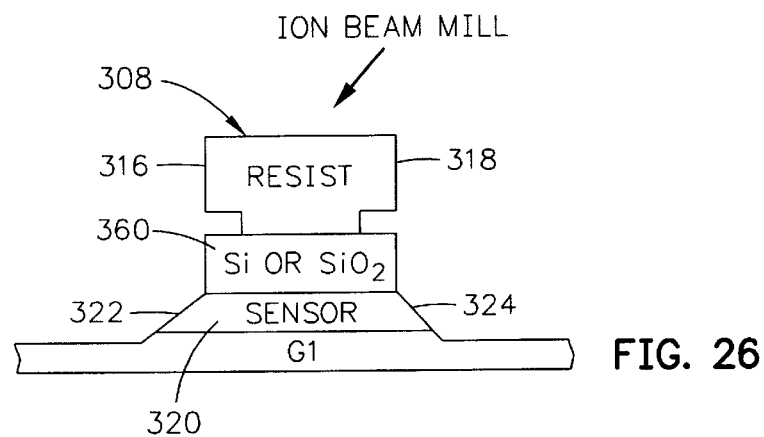
FIG. 26 is the same as FIG. 27 except ion milling is employed for defining the first and second side edges of the read sensor layer.

FIGS. 25 and 26 illustrate alternate steps to the steps shown in FIGS. 17 and 18. In FIG. 25 a silicon (Si) or silicon dioxide ($SiO_2$) material is employed for the read track width defining layer portion 360 instead of carbon as shown in FIG. 17. The chamber may contain 20% freon ($CF_4$) and 80% helium (He) under a pressure of 5 millitorr. An rf bias of 150 watts may be applied to the wafer substrate. In this instance all of the read track width defining material layer is removed by reactive ion etching (REE) with a fluorine base, such as freon ($CF_6$), which is selective by a ratio of 5 to 1 to the silicon (Si) or silicon dioxide ($SiO_2$) with respect to the read sensor material layer 304 and the photoresist 308. In FIG. 26 ion beam milling is employed for defining the first and second side edges 322 and 324 of the read sensor 320. The rate of ion beam milling of the read sensor material layer with respect to the read track width defining layer 360 and the photoresistlayer 308 is about 1/1.

Clearly, other embodiments and modifications of this invention will occur readily to those of ordinary skill in the art in view of these teachings. Therefore, this invention is to be limited only by following claims, which include all such embodiments and modifications when viewed in conjunction with the above specification and accompanying drawings.

We claim:

1. A magnetic head that has an air bearing surface (ABS), a top and a bottom and that includes a read head, the read head comprising:
   a read sensor layer that has first and second sloping side edges that are separated at tops of the first and second sloping side edges by a first width that defines a track width of the read sensor;
   a nonmagnetic electrically insulative read track width defining layer on a top of the read sensor that has first and second vertical side edges that are separated by a second width that is substantially equal to said first width;
   first and second lead layers wherein each lead layer has a side edge;
   the side edge of the first lead layer abutting the first side edge of each of the read sensor layer and the read track width defining layer; and
   the side edge of the second lead layer abutting the second side edge of each of the read sensor layer and the read track width defining layer.

2. A magnetic head as claimed in claim 1 wherein the read track width defining layer is carbon.

3. A magnetic head as claimed in claim 2 wherein the read head further comprises:
   a ferromagnetic first shield layer;
   a nonmagnetic electrically insulative first gap layer located between the first shield layer and the read sensor layer;
   a ferromagnetic second shield layer; and
   a nonmagnetic electrically insulative gap layer located between the read track width defining layer and the second shield layer.

4. A magnetic head as claimed in claim 3 that further includes a write head, the write head comprising:
   a first pole piece layer that has a pole tip region, a yoke region and a back gap region;
   a nonmagnetic write gap layer on the first pole piece in the pole tip region;
   an insulation stack with at least one write coil layer embedded therein on the first pole piece layer in the yoke region; and
   a second pole piece layer on the write gap layer in the pole tip region, the insulation stack in the yoke region and connected to the first pole piece in the back gap region.

5. A magnetic head as claimed in claim 4 wherein the read track width defining layer portion is 100–500 Å thick.

6. A magnetic head as claimed in claim 5 wherein the read track width defining layer is 200 Å thick.

7. A magnetic head as claimed in claim 5 wherein the first gap layer is carbon.

8. A magnetic head as claimed in claim 1 wherein the read track width defining layer is silicon (Si) or silicon dioxide ($SiO_2$).

9. A magnetic head as claimed in claim 8 wherein the read head further comprises:
   a ferromagnetic first shield layer;
   a nonmagnetic electrically insulative first gap layer located between the first shield layer and the read sensor layer;
   a ferromagnetic second shield layer; and
   a nonmagnetic electrically insulative gap layer located between the read track width defining layer and the second shield layer.

10. A magnetic head as claimed in claim 9 that further includes a write head, the write head comprising:
    a first pole piece layer that has a pole tip region, a yoke region and a back gap region;
    a nonmagnetic write gap layer on the first pole piece in the pole tip region;
    an insulation stack with at least one write coil layer embedded therein on the first pole piece layer in the yoke region; and
    a second pole piece layer on the write gap layer in the pole tip region, the insulation stack in the yoke region and connected to the first pole piece in the back gap region.

11. A magnetic head as claimed in claim 10 wherein the read track width defining layer portion is 100–500 Å thick.

12. A magnetic head as claimed in claim 11 wherein the read track width defining layer is 200 Å thick.

13. A magnetic head as claimed in claim 11 wherein the first gap layer is silicon (Si) or silicon dioxide ($SiO_2$).

14. A magnetic disk drive that includes a magnetic head that has an air bearing surface (ABS) and a yoke region between a pole tip region and a back gap region wherein the pole tip region is partially bounded by said ABS, the disk drive comprising:

the magnetic head having a top and a bottom and including a combined read head and write head;

the read head including:
- a read sensor layer that has first and second sloping side edges that are separated at tops of the first and second sloping side edges by a first width that defines a track width of the read sensor;
- a nonmagnetic electrically insulative read track width defining layer on a top of the read sensor that has first and second vertical side edges that are separated by a second width that is substantially equal to said first width;
- first and second lead layers wherein each lead layer has a side edge;
- the side edge of the first lead layer abutting the first side edge of each of the read sensor layer and the read track width defining layer; and
- the side edge of the second lead layer abutting the second side edge of each of the read sensor layer and the read track width defining layer;
- first and second ferromagnetic shield layers;
- first and second nonmagnetic electrically insulative gap layers located between the first and second ferromagnetic shield layers;
- the read sensor layer, the read track defining layer and the first and second lead layers being located between the first and second gap layers;

the write head including:
- a first pole piece layer that has a pole tip region, a yoke region and a back gap region;
- a nonmagnetic write gap layer on the first pole piece in the pole tip region;
- an insulation stack with at least one write coil layer embedded therein on the first pole piece layer in the yoke region; and
- a second pole piece layer on the write gap layer in the pole tip region, the insulation stack in the yoke region and connected to the first pole piece in the back gap region;

a housing;

a magnetic disk rotatably supported in the housing;

a support mounted in the housing for supporting the magnetic head with its ABS facing the magnetic disk so that the magnetic head is in a transducing relationship with the magnetic disk, means for rotating the magnetic disk;

positioning means connected to the support for moving the magnetic head to multiple positions with respect to said magnetic disk; and processing means connected to the magnetic head, to the means for rotating the magnetic disk and to the positioning means for exchanging signals with the merged magnetic head, for controlling movement of the magnetic disk and for controlling the position of the magnetic head.

15. A magnetic disk drive as claimed in claim 14 wherein the read track width defining layer is carbon.

16. A magnetic disk drive as claimed in claim 15 wherein the read track width defining layer portion is 100–500 Å thick.

17. A magnetic disk drive as claimed in claim 16 wherein the first gap layer is carbon.

18. A magnetic disk drive as claimed in claim 14 wherein the read track width defining layer is silicon (Si) or silicon dioxide ($SiO_2$).

19. A magnetic disk drive as claimed in claim 18 wherein the read track width defining layer portion is 100–500 Å thick.

20. A magnetic disk drive as claimed in claim 19 wherein the first gap layer is silicon (Si) or silicon dioxide ($SiO_2$).

* * * * *